US010055088B1

(12) United States Patent
Boggan et al.

(10) Patent No.: US 10,055,088 B1
(45) Date of Patent: Aug. 21, 2018

(54) USER INTERFACE WITH MEDIA CONTENT PREDICTION

(71) Applicant: Amazon Technologies, Inc., Reno, NV (US)

(72) Inventors: Scott Lee Boggan, Seattle, WA (US); Sasha Mikhael Perez, Seattle, WA (US); David Michael Rowell, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 14/221,118

(22) Filed: Mar. 20, 2014

(51) Int. Cl.
*G06F 17/00* (2006.01)
*G06F 3/0481* (2013.01)

(52) U.S. Cl.
CPC .............................. *G06F 3/04817* (2013.01)

(58) Field of Classification Search
CPC ......... G06F 17/30864; G06F 17/30867; G06F 17/30696
USPC ......................................... 715/765, 811, 825
See application file for complete search history.

(56) References Cited

U.S. PATENT DOCUMENTS

| | | | | |
|---|---|---|---|---|
| 6,098,064 A * | 8/2000 | Pirolli | ............... | G06F 17/30902 |
| 7,386,279 B2 * | 6/2008 | Wagner | ............... | G06F 3/04817 |
| | | | | 455/556.2 |
| 7,979,882 B2 * | 7/2011 | Choi | ............... | H04H 20/24 |
| | | | | 379/142.16 |
| 8,082,321 B2 * | 12/2011 | Ho | ............... | H04L 65/4084 |
| | | | | 709/217 |
| 8,103,968 B2 * | 1/2012 | Cheng | ............... | G06F 3/0483 |
| | | | | 715/767 |
| 8,245,143 B2 * | 8/2012 | Yach | ............... | G06F 1/1626 |
| | | | | 715/744 |
| 8,843,853 B1 * | 9/2014 | Smoak | ............... | G06F 3/0482 |
| | | | | 715/839 |
| 8,875,038 B2 * | 10/2014 | Ismalon | ............... | G06F 17/3089 |
| | | | | 715/708 |
| 9,208,616 B2 * | 12/2015 | Kim | ............... | G06T 19/20 |
| 2002/0041262 A1 * | 4/2002 | Mukai | ............... | G06F 1/1613 |
| | | | | 345/30 |
| 2003/0118087 A1 * | 6/2003 | Goldthwaite | ............... | G06F 17/30873 |
| | | | | 375/219 |
| 2005/0050172 A1 * | 3/2005 | Redpath | ............... | G06F 17/30899 |
| | | | | 709/219 |
| 2005/0066209 A1 * | 3/2005 | Kee | ............... | G06F 1/1616 |
| | | | | 713/323 |
| 2005/0240965 A1 * | 10/2005 | Watson | ............... | H04N 5/44543 |
| | | | | 725/45 |
| 2007/0245265 A1 * | 10/2007 | Zerba | ............... | G06Q 30/02 |
| | | | | 715/837 |
| 2008/0039058 A1 * | 2/2008 | Ray | ............... | H04W 28/14 |
| | | | | 455/414.3 |
| 2008/0113665 A1 * | 5/2008 | Paas | ............... | H04M 1/72522 |
| | | | | 455/426.1 |
| 2009/0006308 A1 * | 1/2009 | Fonsen | ............... | G06F 17/30902 |

(Continued)

*Primary Examiner* — Daeho D Song
(74) *Attorney, Agent, or Firm* — Lee & Hayes, PLLC

(57) ABSTRACT

Some implementations include displaying icons on a home screen of a computing device based, at least in part, on a predicted likelihood that an individual one of the icons will be selected. The predicted likelihoods may be determined based on a current time of day, a geo-location of the computing device, a current mode of the computing device, or the like.

20 Claims, 8 Drawing Sheets

(56) References Cited

U.S. PATENT DOCUMENTS

| | | | |
|---|---|---|---|
| 2009/0070708 A1* | 3/2009 | Finkelstein | G06Q 10/10 715/789 |
| 2009/0258649 A1* | 10/2009 | Salowey | H04W 4/02 455/435.2 |
| 2010/0042857 A1* | 2/2010 | Zommer | G06F 1/3203 713/320 |
| 2010/0162126 A1* | 6/2010 | Donaldson | G06F 17/30902 715/738 |
| 2011/0125783 A1* | 5/2011 | Whale | G06F 17/30011 707/769 |
| 2011/0202848 A1* | 8/2011 | Ismalon | G06F 17/3089 715/738 |
| 2011/0283189 A1* | 11/2011 | McCarty | H04N 5/44543 715/707 |
| 2012/0015624 A1* | 1/2012 | Scott | G06F 9/4443 455/405 |
| 2012/0071208 A1* | 3/2012 | Lee | H04M 1/72544 455/566 |
| 2012/0179999 A1* | 7/2012 | Nesladek | G06F 3/0488 715/835 |
| 2012/0278722 A1* | 11/2012 | Raleigh | H04L 12/14 715/735 |
| 2013/0002706 A1* | 1/2013 | Rezende | G06F 3/04845 345/619 |
| 2013/0044868 A1* | 2/2013 | Huai | H04W 76/10 379/90.01 |
| 2013/0083075 A1* | 4/2013 | Luomala | G09G 5/14 345/660 |
| 2013/0109409 A1* | 5/2013 | Ortiz | H04W 4/02 455/456.3 |
| 2013/0111356 A1* | 5/2013 | Vasudevan | G06F 3/04817 715/753 |
| 2013/0117685 A1* | 5/2013 | Jang | H04N 21/231 715/744 |
| 2013/0187753 A1* | 7/2013 | Chiriyankandath | G06F 3/0488 340/5.51 |
| 2013/0205340 A1* | 8/2013 | Stahl | G06Q 20/123 725/39 |
| 2013/0212484 A1* | 8/2013 | Joshi | G06F 9/541 715/740 |
| 2013/0238540 A1* | 9/2013 | O'Donoghue | G06N 5/02 706/46 |
| 2013/0238724 A1* | 9/2013 | Cunningham | H04L 51/24 709/206 |
| 2014/0047350 A1* | 2/2014 | Kim et al. | G06F 3/0482 715/739 |
| 2014/0075352 A1* | 3/2014 | Hansen | G06F 9/4451 715/765 |
| 2014/0075385 A1* | 3/2014 | Wan | G06Q 10/1093 715/812 |
| 2014/0095943 A1* | 4/2014 | Kohlenberg | H04W 4/029 714/47.3 |
| 2014/0101583 A1* | 4/2014 | Jeong | G06F 9/451 715/765 |
| 2014/0136977 A1* | 5/2014 | Arun | G06F 3/0482 715/716 |
| 2014/0188956 A1* | 7/2014 | Subba | G06F 9/453 707/829 |
| 2014/0337458 A1* | 11/2014 | Barton | H04L 67/2847 709/213 |
| 2014/0358826 A1* | 12/2014 | Traupman | G06N 5/048 706/11 |
| 2014/0359456 A1* | 12/2014 | Thiele | H04W 4/027 715/735 |
| 2014/0372423 A1* | 12/2014 | Majumder | G06F 17/30 707/725 |
| 2015/0081695 A1* | 3/2015 | Schillings | G06F 17/30867 707/736 |
| 2015/0126234 A1* | 5/2015 | Rodriguez | G08B 13/22 455/457 |

\* cited by examiner

USER INTERFACE WITH MEDIA CONTENT PREDICTION

BACKGROUND

Handheld computing devices such as electronic book reader devices, smartphones, personal data assistants, personal media players, and tablet computers have begun to rival personal computers for versatility and functionality. Users of such devices are able to perform a multitude of functions such as checking email, browsing the internet, viewing videos, playing games, downloading applications, listening to music, and reading eBooks. Users find these devices handy for consuming media while commuting, travelling, or while just staying at home.

Many such devices have graphical user interfaces paired with touch screen input capability. A "home screen" or "start screen" of the device usually presents a collection of application icons. If a user desires to view media content, such as video or music content, the user launches the appropriate application and selects the content that he or she desires. To obtain new content, the user launches a web browser or a dedicated application for purchasing or discovering new content, and browses the selections available from various sources.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 illustrates yet another example of icon groupings. Here, the groupings again include the first three groupings from FIG. 2, as well as a grouping of icons corresponding to items that are predicted to be particularly of use to a user when the user is at home. The device (or another entity) may determine that the user is at home based on a geo-location ("location") of the device, based on a current time of day, and/or the like.

FIG. 6 illustrates yet another example of icon groupings. Here, the groupings again include the first three groupings from FIG. 2, as well as a grouping of icons corresponding to items that are predicted to be particularly of use to a user when the user is at her office. Again, the device (or another entity) may determine that the user is at the office based on a geo-location ("location") of the device, based on a current time of day, and/or the like.

DETAILED DESCRIPTION

Figure 1:
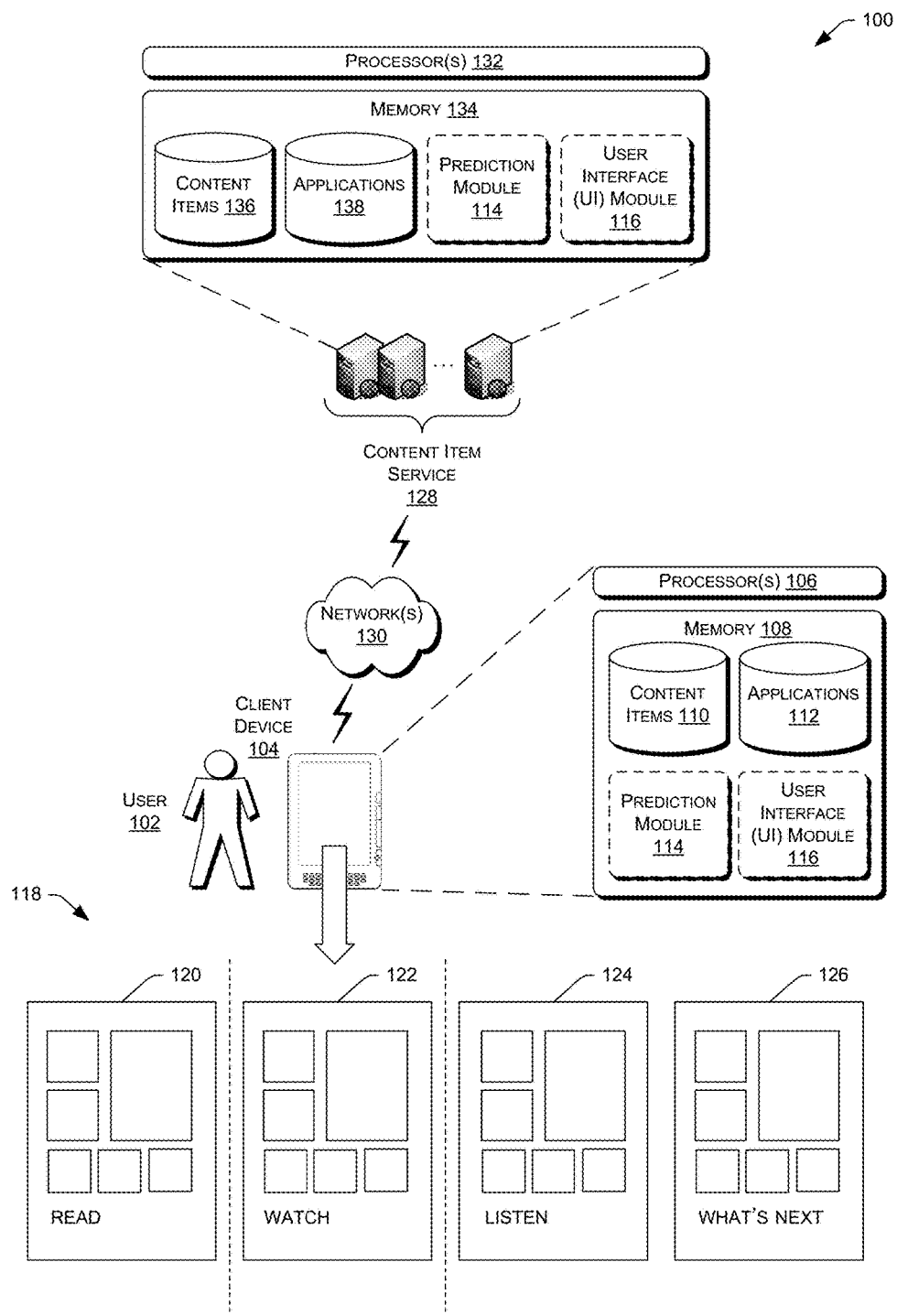
FIG. 1 shows an example environment that includes a client device configured to predict, based on one or more factors, items that a user may select to execute on the device. In response, the device includes, on a home screen of the device, a grouping of icons corresponding to the predicted items.

As noted above, conventional handheld computing devices have user interfaces (UI) that display start screens with application icons that are selectable to launch the associated applications. To select particular content—such as a particular electronic book, song, or video—the user launches the appropriate application and then selects the content that he or she desires.

Some examples herein describe a computing device, and a user interface (UI) for a computing device, that streamlines the process of accessing and obtaining items, such as media items, applications, and the like. A home screen of the UI displays one or more groupings of icons, with the icons corresponding to items that are available to the device. The items may be audio files, video files, electronic books, web content, and so forth. Some of the applications and content items may also be an aggregate of other applications and/or content items, such as a playlist of songs, an album, a television series, multiple related applications (e.g., social networking applications), or the like. The applications and content items may be stored on the device or available to the device via a network connection. The list may include other things such as widgets, profile information, and so forth. The UI presents the icon groupings based, at least in part, on a prediction of how likely a user of the device is to select the individual icons corresponding to the items (e.g., applications and content items).

In some instances, one or more factors may be assessed to determine those items that a user of a device is most likely to execute at a certain time. For instance, the device or another entity may track items often accessed by users during the course of day, week, month, season, etc. The device may then use this "time of day" information to predict that the user is more likely to select a particular item at a certain time of day (e.g., a particular book that the user has been reading before going to bed) and/or may predict that the user is likely to select a particular class of items at a certain time of day (e.g., books at night). The device may then display an icon corresponding to this book (or to multiple books) at night.

Conversely, the device or another entity may determine that the user often spends time on her social-networking application in the morning and, hence, may predict that the user is likely to launch this application in subsequent mornings. The device may then display an icon corresponding to this application in the morning.

In addition or in the alternative, the device or another entity may track how a user consumes items based on location. For instance, each time a user accesses a certain item, the device or another entity may determine the location that the user was at or is at when consuming the item. Thereafter, the device may predict how likely a user is to access an item by comparing a current location of the device with items and/or classes of items previously accessed at the current location (or within a threshold distance of the current location) or at similar locations. For instance, the device may determine that the user often plays games on her device when at home, and often utilizes productivity applications when at a geo-location associated with her office. The device may then display different icons based on a current location of the device. Further, the device or another entity may determine location in any number of ways, such as using global positioning satellite (GPS) data, triangulation, wireless network information, by querying the user, and/or the like.

In still another example, the device or another entity may track item consumption on a device according to a mode of the device (and/or according to the status of certain functionality of the device). For instance, the device may determine (or may be preconfigured to determine) that the user only accesses items stored locally on the device when the device is in airplane mode or when the device otherwise lacks wireless connectivity. Thereafter, when the device is in airplane mode or otherwise lacks network connectivity, the device may display icons corresponding to items stored locally on the device. Other modes may comprise a long-battery life mode, a low-light mode, a high-light mode, a low-battery mode, or the like.

In addition or in the alternative, the device or another entity may utilize user actions on the device in order to predict which items the user is likely to access. For instance, the device may take into account "recency" data, which may include a most recent access time, a most recent purchase time, a most recent download time, or other time-based data. Items with more recent accesses, purchases, downloads, etc. may be predicted to be more likely to be accessed than items with less recent accesses, purchases, downloads, etc. Predictions may also be made based on the recent availability of an application or content item, even if the application or content item is not available. In one example, a newly available television episode may be listed high in the list based on prior viewing of other episodes in the same television series, even if the newly available television episode has not been previously downloaded, accessed, or purchased. Further, if the user just finished one episode of a particular show, the next episode may be determined to have a likelihood of access by the user.

In some instances, the device or another entity may also predict what items a user is likely to access based on one or more aspects of an electronic device. The aspects may include a size of the display of the device, a primarily intended functionality of the device (e.g., talking on the phone, watching television or movies, etc.), a class of items most often accessed by the user on the device, or the like. For instance, if a user often reads books on her tablet computing device but most often listens to music on her phone (both of which are both associated with a common user account and, hence, common items), then the tablet device may tend to display more icons corresponding to books or book applications while the phone may tend to display more icons corresponding to songs or music applications.

Further, the device or another entity may determine what devices are nearby the device when determining the icon grouping to surface and/or the icons to surface within the groupings. For instance, if the device comprises a smart phone, and the smart phone or another entity determines that a tablet computing device (with a larger display) is proximate the smart phone, then the smart phone might not display as many icons corresponding to videos—instead allowing the tablet computing device with the larger screen to display these icons. The devices or a remoter service may determine the proximity of devices using an array of techniques, including comparing global positioning satellite (GPS) coordinates, Bluetooth, determining whether the devices are connected to the same wireless access point (WAP), or the like.

In some instances, the icon groupings comprise heterogeneous groups that include icons corresponding to a particular item class and/or primary intended use of the underlying item. For instance, the device may include, in some instances, one or more of the following icon groupings:

"Read"
    This grouping includes icons corresponding to icons that are primarily intended to be read, such as books, magazines, articles, documents, and the like.

"Watch"
    This grouping includes icons corresponding to items that are primarily intended to be watched, such as movies, home videos, internet videos, and the like.

"Listen"
    This grouping includes icons corresponding to items that are primarily intended to be listened to, such as songs and other audio files.

"Play"
    This grouping includes icons corresponding to items that are primarily intended to be played, such as games and the like. The icons may include icons for the games themselves, indications for when it is the user's turn in a game, icon indicating achievements or rewards acquired, or the like.

"Do"
    This grouping includes icons corresponding to items that are primarily intended to be used to accomplish a task, such as compose a document, send an email, or the like. This grouping may include icons corresponding to certain applications.

"Shop"
    This grouping includes icons corresponding to items that are primarily intended to be used to purchase certain products (digital and/or tangible). For instance, shopping applications and widgets may be included in this grouping.

"Recently Watched/Read/Bought/etc."
    This grouping may include icons corresponding to items recently consumed by the user, either collectively or by item class. For instance, this grouping may include items across item classes (e.g., books, movies, etc.), or this grouping may comprise items from a single class (e.g., items that are to be "read"). In the latter instances, the device may surface multiple different groupings (e.g., "recently read", "recently watched", "recently listened to", etc.).

While a few example groupings have been listed, it is to be appreciated that other implementations may include more, fewer, and/or different groupings. Furthermore, in some instances items that are predicted to be accessed based on the factors introduced above may be display across some or all of the above example groupings. For instance, in some instances, an icon of a book that is predicted to be read (based on a current location or time of day) may be displayed within the "read" icon. In other implementations, however, the device may display an icon grouping that includes only icons corresponding to the predicted items, as discussed in further detail below.

The present description uses the words "start screen" and "home screen" to describe a primary or default screen shown to users via a UI. In various embodiments, the home screen is the screen displayed after the user presses a "home" button or selects an analogous touch screen feature or after the device is powered on or woken up from a low-power state, either immediately after power-on or wake up or after an initial unlock screen(s) and/or start-up screen(s). A home screen may be the first screen in the UI hierarchy that allows the user to launch applications or content, and is typically the screen from which substantially all other functions are accessible, either directly or indirectly, without having to "back out" to a previous screen in the UI hierarchy.

The techniques and systems described herein may be implemented in a number of ways. Example implementations are provided below with reference to the following figures.

FIG. 1 shows an example environment 100 that includes a user 102 operating a client device 104 configured to predict, based on one or more factors, items that the user 102 may select to execute on the device 104. In response, the device includes, on a home screen of the device, a grouping of icons corresponding to the predicted items. While illustrated as an electronic book reader device, the device 104 may comprise any other sort of device, such as a mobile phone, a tablet computing device, a laptop computer, a desktop computer, and/or the like. Furthermore, in some instances the user 102 may be associated with multiple devices, and the item prediction may be based at least in part on which device the user is currently using, as discussed above.

As illustrated, the device 104 includes one or more processors 106 and memory 108. The memory 108 may include volatile memory (such as RAM), nonvolatile memory, removable memory, and/or non-removable memory, implemented in any method or technology for storage of information, such as computer-readable instructions, data structures, program modules, or other data. Also, the processor(s) 106 may include onboard memory in addition to or instead of the memory 108. Some examples of the memory 108 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium usable to store the desired information and that can be accessed by the device 104.

The memory 108 may include software programs or other executable modules that may be executed by the processor(s) 106. Examples of such programs or modules include control modules (e.g., power management), network connection software, an operating system, sensor algorithms, and so forth. The memory 108 may also be used to store various databases. Various processes, instructions, methods and techniques described herein may be considered in the general context of computer-executable instructions, such as program modules, that are executable by one or more computers or other devices. Generally, program modules include routines, programs, objects, components, data structures, etc. for performing particular tasks or implementing particular abstract data types. These program modules can be implemented as software modules that are executable on the processor(s) 106, as hardware, and/or as firmware. Typically, the functionality of the program modules may be combined or distributed as desired in various embodiments. An implementation of these modules and techniques may be stored on or transmitted across some form of computer-readable media.

As illustrated, the memory 108 may store one or more content items 110, one or more applications 112, a prediction module 114, and a user interface (UI) module 116. As discussed below, in some instances a remote entity may additionally or alternatively store instances of the prediction and/or UI modules.

The user interface module 116 causes display of a user interface (UI), including a home screen on a display of the computing device 100. In some instances, the display comprises a touch-sensitive display configured to accept touch gestures from a user. The home screen—examples of which are illustrated in subsequent figures—includes icon groupings 118 that include icons corresponding to items (e.g., content items and applications) available to the device 104. The content items 110 include media files stored on the device 104 and/or links to media files stored elsewhere and accessible to the device 104 via a network connection (that is, files stored at other, remote locations but that device may access).

In various embodiments, the content items 110 include one or more electronic books, videos (such as television episodes, movies, music videos, news segments, and others), blog content, web content, periodicals such as electronic versions of newspapers and magazines, and audio files (such as music files, audio book segments, and podcasts). In addition, the user interface module 116 is configured to display aggregated media content items, such as music albums, audio books, playlists, collections of television programs or television series, periodical subscriptions, aggregates of frequently accessed web or blog content, a most recently played songs list, and others. The user interface module 116 is configured to display other items in the list such as advertisements, promotional offers, special offers, content recommendations, user profile information/links, third party widgets, system settings/links, and so forth.

In some instances, the user interface module 110 may display icons that are selectable to launch an appropriate one of the applications 112 to view, listen, or otherwise consume the corresponding one of the content items 110 or cause the device to display a detail page associated with the content item at an online marketplace. In embodiments, the icons include "cover art" for the content items 110. In embodiments, where one or more applications 112 are listed in the list, the icons may resemble application icons. In embodiments where blog and/or web content are displayed, the icons may include website or blog logos and may include content taken from the blog or website. The icons include, in various embodiments, the front page or cover of one or more periodicals. Where the list includes an aggregation of media content items, the icons may include a graphical icon mosaic with two or more icons corresponding to some or all of the aggregated media content items may be displayed to represent two or more of the aggregated media content items.

The user interface module 116 is configured to accept user input from user input device(s). In some instances, the user input device(s) may include a touch screen that overlays or is integrated with the display. The user input device(s) may include other types of input devices such as pointer devices, buttons, audio input devices, keyboards, and so forth. A user may use the input device(s) to tap on or otherwise select a graphical icon displayed within the list to download, purchase, access, and/or launch the content or underlying application associated with the tapped graphical icon.

As noted above, the user interface module 116 is configured in various embodiments to display only a portion of the items that are available to the device 104. In these embodiments, the user interface module 116 is configured to allow the icon groupings 118 to be interactive to cause display of additional icons. A user may swipe through the list using a touch screen display or interact with the list using some other user input device type. The UI may be scrollable, such that a user may scroll through the list with the device using animation by, for example, showing a sliding view of the available content. In embodiments, the icons may be presented as a "carousel" that rotates either to the left or to the right (or up or down) depending on the received user input. That is, the user may effectively "spin" the carousel via touch gestures swiping to the left or right (or up or down). The "carousel" may be looped, such that scrolling through the list of content media items to the end of the list results in a return to the beginning of the list. In other instances, the "carousel" is not looped, such that scrolling to the end of the list does not result in a return to the beginning of the list.

For instance, FIG. 1 illustrates four example icon groupings 118, including a "read" grouping 120, a "watch" grouping 122, a "listen" grouping 124, and a "what's next" grouping 126. The read grouping 120 may include icons corresponding to items that are primarily intended to be read. The watch grouping 122, meanwhile, may include icons corresponding to items that are primarily intended to be watched, such as movies and other videos. The listen grouping may include icons corresponding to items that are primarily intended to be listened to, such as songs and the like. Finally, the example what's next grouping 126 includes icons corresponding to items that the prediction module 114 has predicted are most likely to be selected by the user 102, as described below. While FIG. 1 illustrates that the display of the device 104 currently displays the watch grouping 122, the user interface module 116 allows the user to swipe left or right to view the other groupings.

As discussed above, the prediction module 114 is configured to determine the icons for inclusion in the grouping 126 of the current example. This may include calculating the likelihood that each icon will be selected and/or receiving an indication of the order from a remote entity, such as the content item service 128 discussed below. The prediction module 114 is configured, in embodiments, to predict the likelihood of user interaction based on history data associated with the individual ones of the content items 110 and applications 112. The history data may include, among other things, recency data associated with the times of most recent download, access, and/or purchase of the various content items 110 and applications 112, locations which the user 102 accessed these items (on the device 104 and/or other devices), a time of day, day of the week, or the like that the user accessed the items, a pattern of access of the items (e.g., patterns in items accessed sequentially), device modes that were operable when the user 102 accessed the items, device types used to access the items, devices also associated with the user 102 that are proximate to the device 104, and/or the like. This data may then be used to calculate likelihoods that the user will access the different items at a current time.

As described above, in some instances the device 104 includes the prediction module 114. In other instances, meanwhile, the device may receive, over a network 130, indications of the likelihood data from the content item service 128. As illustrated, the content item service 128 includes one or more processors 132 and memory 134, which stores content items 136, applications 138, the prediction module 114, and the user interface module 116. In this example, the prediction module 114 stored on the content item service 128 may predict which items the user 102 is most likely to select, while the user interface module 116 provides instructions to the device 104 to display the icon groupings 118 according to the likelihoods calculated by the prediction module 114.

Figure 2:
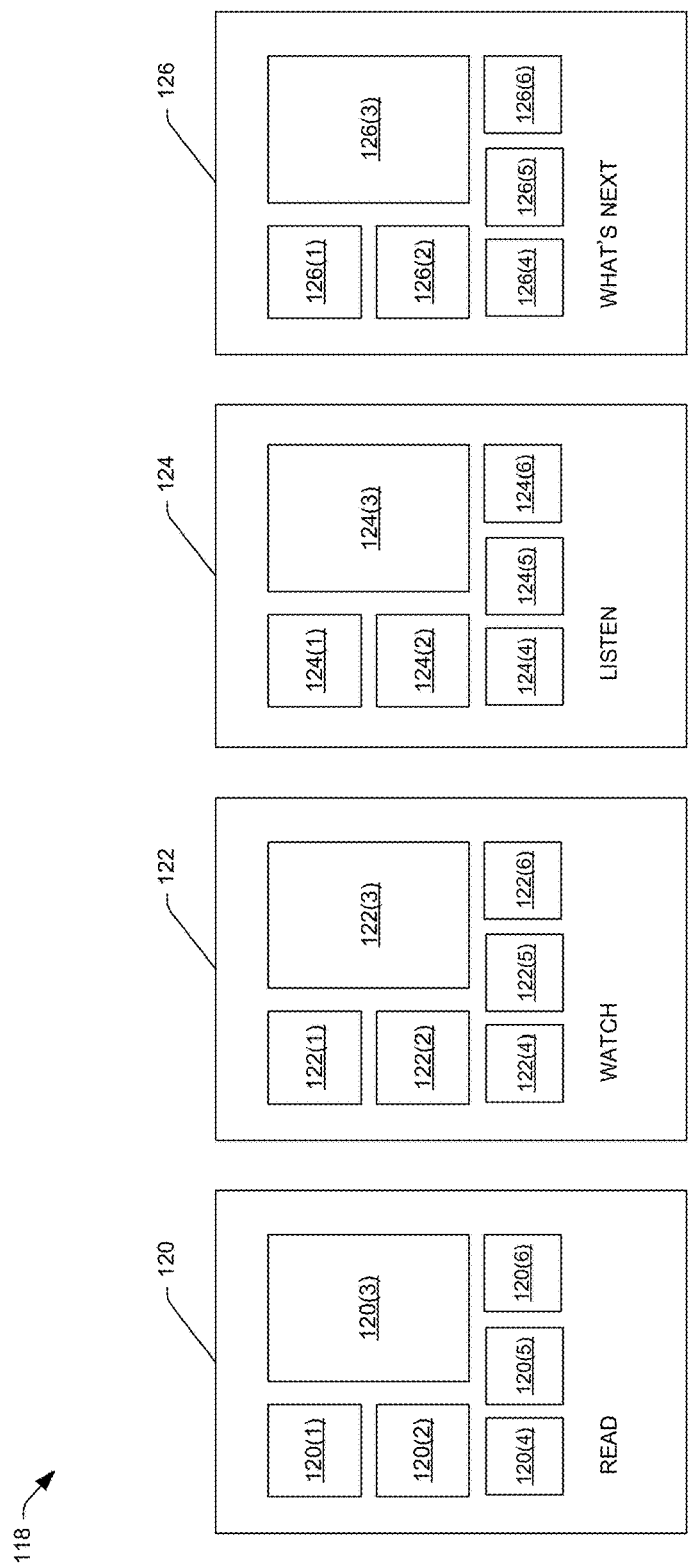
FIG. 2 illustrates four example groupings of icons, including a grouping that includes icons corresponding to items that are primarily intended for reading (e.g., primarily contain text), a grouping that includes icons corresponding to items that are primarily intended for watching (e.g., primarily contain video), a grouping that includes icons corresponding to items that are primarily intended for listening to (e.g., primarily contain audio), and a grouping that includes icons corresponding to items that are predicted to be of current interest to the user.

FIG. 2 illustrates the four example groupings of icons 118 of FIG. 1. As illustrated, the grouping 120 includes icons 120(1), 120(2), . . . , 120(6) corresponding to items that are primarily intended for reading, such as books, manuals, documents, and the like. The grouping 122, meanwhile, includes icons 122(1), 122(2), . . . , 122(6) corresponding to items that are primarily intended for watching, such as movies, and other videos. The grouping 124 includes icons 124(1), 124(2), . . . , 124(6) corresponding to items that are primarily intended for listening to, such as songs and other audio files. Finally, the grouping 126 includes icons 126(1), 126(2), . . . , 126(6) corresponding to items that are predicted to be of current interest to the user based on one or more factors. These factors may include a time of day, a location of the device, a current mode of the device, or the like. In this example, the icons 126(1)-(6) may correspond to different classes of items, such as books, movies, songs, and/or the like.

Figure 3:
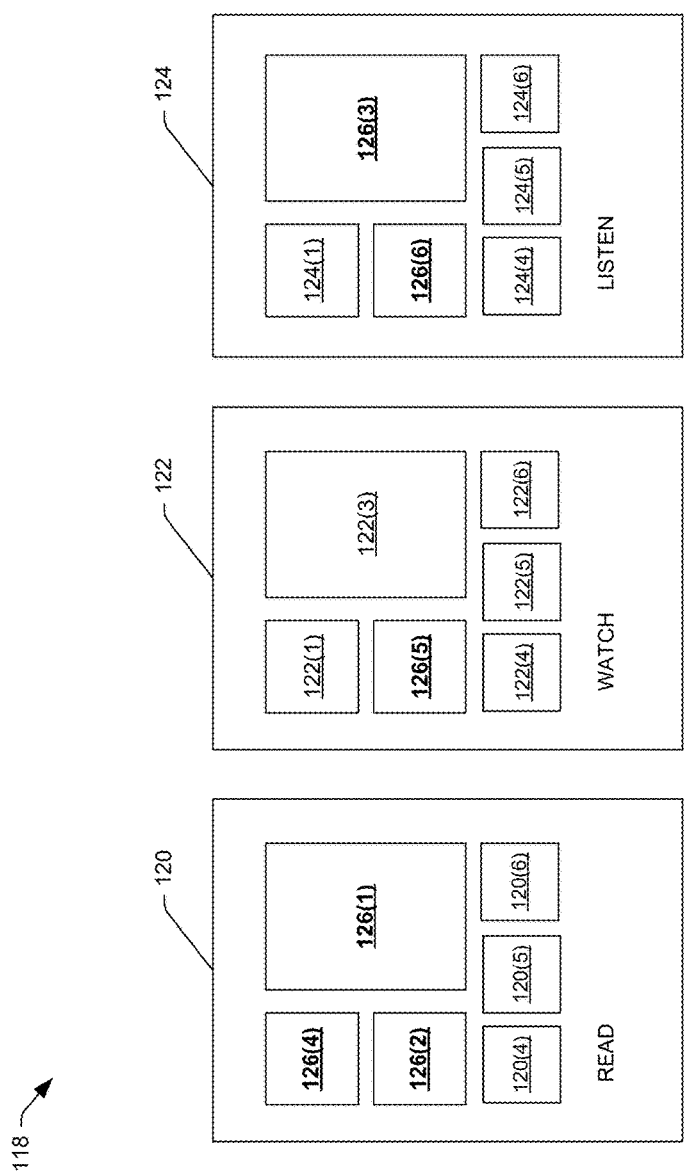
FIG. 3 illustrates three example groupings of items, corresponding to the first three groupings from FIG. 2. In this example, however, the predicted items are displayed across the first three groupings and corresponding to item class. For instance, an icon corresponding to a book that has been predicted to be of current interest to a user of the device may be displayed in the first grouping, which corresponds to items that are primarily intended for reading.

FIG. 3, meanwhile, illustrates an example where the icons 126(1)-(6) are displayed amongst the three example groupings 120, 122, and 124. For instance, in this example the grouping 120 includes icons 126(1), 126(2), and 126(4), each corresponding to an item that has been predicted to be of current interest to the user. Because these three icons appear in the grouping 120, the corresponding items comprise items that are to be read, such as electronic books.

The grouping 122, meanwhile, includes the icon 126(5), predicted to be of current interest to the user. Given its inclusion in the grouping 122, the icon 126(5) corresponds to an item to be watched, such as a movie. Finally, the grouping 124 includes icons 126(3) and 126(6). Given their inclusion in the grouping 124, these icons correspond to items to be listened to, such as songs.

Figure 4:
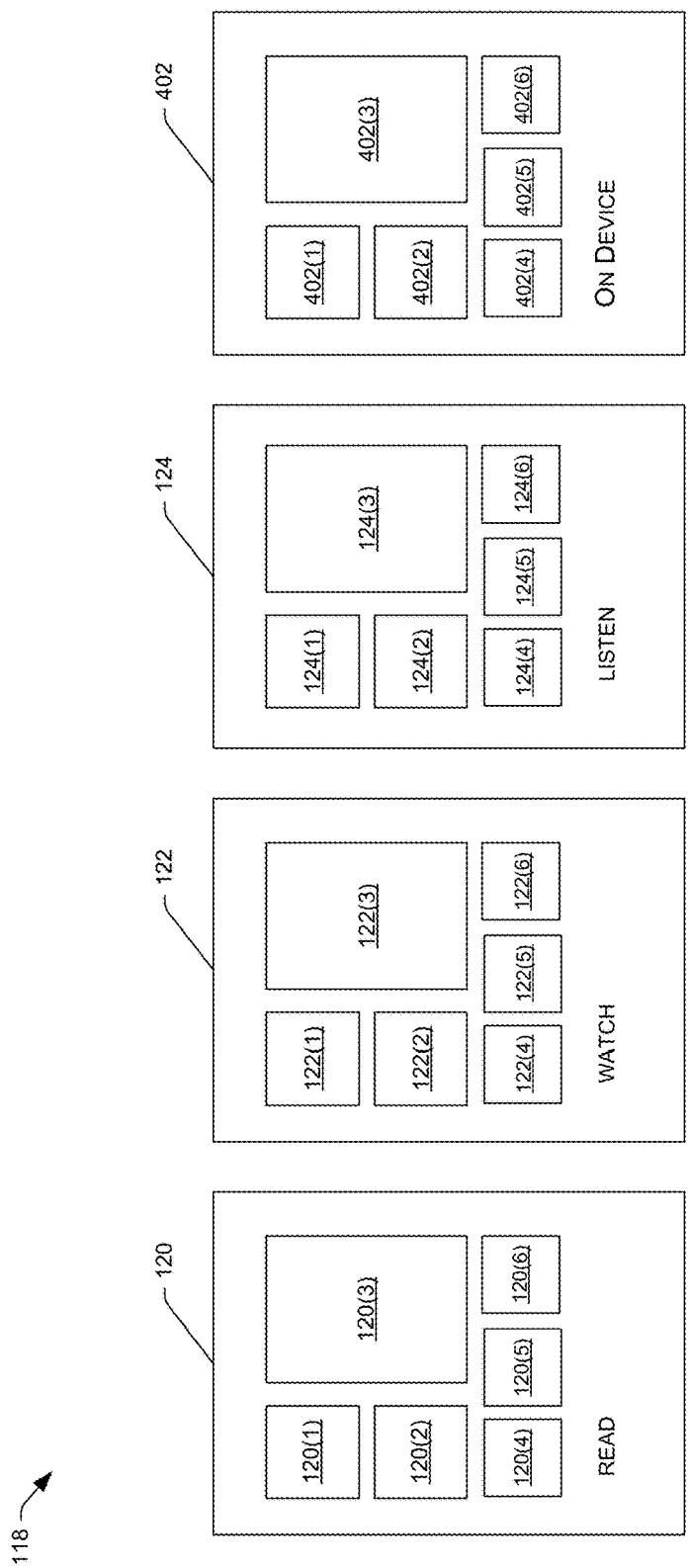
FIG. 4 illustrates another example of icon groupings. Here, the groupings include the first three groupings from FIG. 2, as well as a grouping of icons corresponding to items that are stored locally on the device. The device may display this example grouping, for instance, in response to the device or another entity determining that the device currently lacks network connectivity because a wireless interface of the device is turned off (e.g., is in an "airplane mode").

FIG. 4 illustrates another example of icon groupings 118. Here, the groupings include the first three groupings 120, 122, and 126 described above, as well as a grouping 402 of icons 402(1), 402(2), . . . , 402(6) corresponding to items that are stored locally on the device. The device 104 may display this example grouping, for instance, in response to the device or another entity determining that the device currently lacks network connectivity (e.g., is in an "airplane mode"). Because the device lacks a network connectivity, then the prediction module 114 may determine that those items stored locally on the device are the only items that the user may currently access and, hence, the device 104 may predict that these items are likely to be of interest to the user. In some instances, the icons 402(1)-(6) may correspond to different classes of items, such as books, movies, songs, and/or the like.

Figure 5:
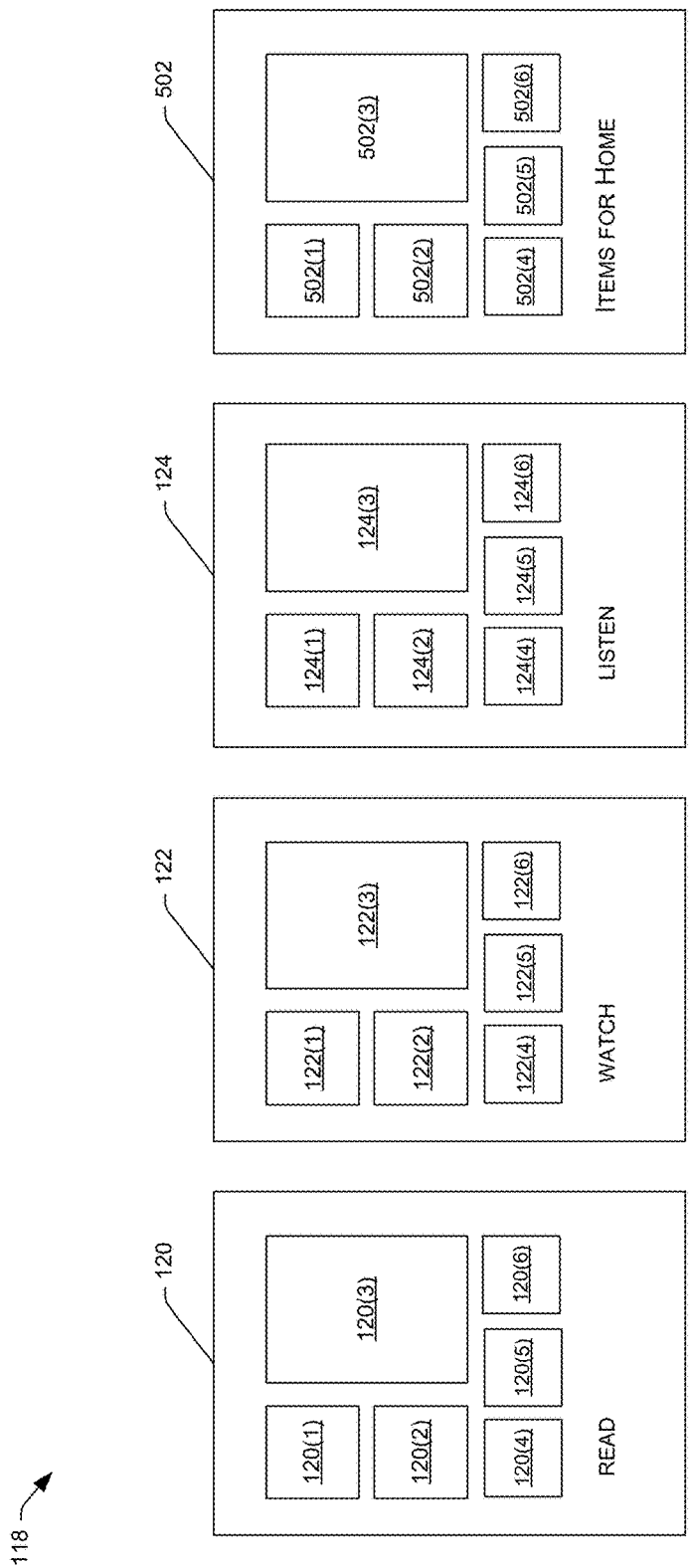

FIG. 5 illustrates yet another example of icon groupings 118. Here, the groupings again include the first three groupings 120, 122, and 126 described above, as well as a grouping 502 of icons 502(1), 502(2), ..., 502(6) corresponding to items that are predicted to be particularly of use to a user when the user is at home. The device may determine that the user is at home based on a current of the device, based on a current time of day, and/or the like. Furthermore, the prediction module 114 may analyze items previously accessed frequently at home and may suggest these items to the user. For instance, the device may determine or deduce that the device is located at home based on GPS coordinates, the time of day, or the like, and may suggest items that the user has often read, listened to, watched, played, or the like when previously at home.

Figure 6:
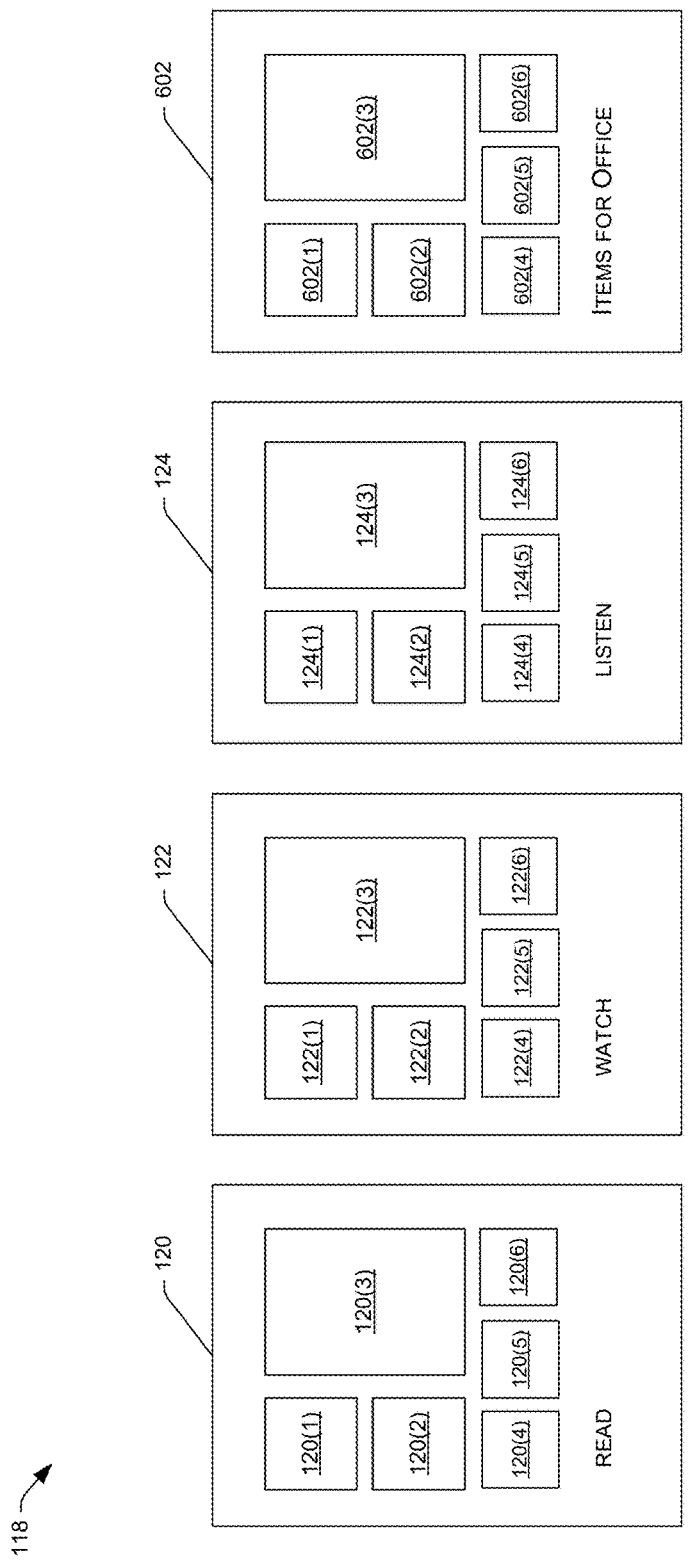

FIG. 6 illustrates yet another example of icon groupings 118. Here, the groupings again include the first three groupings 120, 122, and 126 described above, as well as a grouping 502 of icons 602(1), 602(2), ..., 602(6) corresponding to items that are predicted to be particularly of use to a user when the user is at her office. Again, the device may determine that the user is at the office based on a location of the device, based on a current time of day, and/or the like. Again, the prediction module 114 may use past item access data to determine which items the user is now likely to select while at her office.

The preceding figures illustrated various user interface screens, icons, and icons. But other user interface screens, icons, and icons—and other arrangements of user interface screens, icons, and icons, may be used according to various embodiments to achieve the same or similar results.

Figure 7:
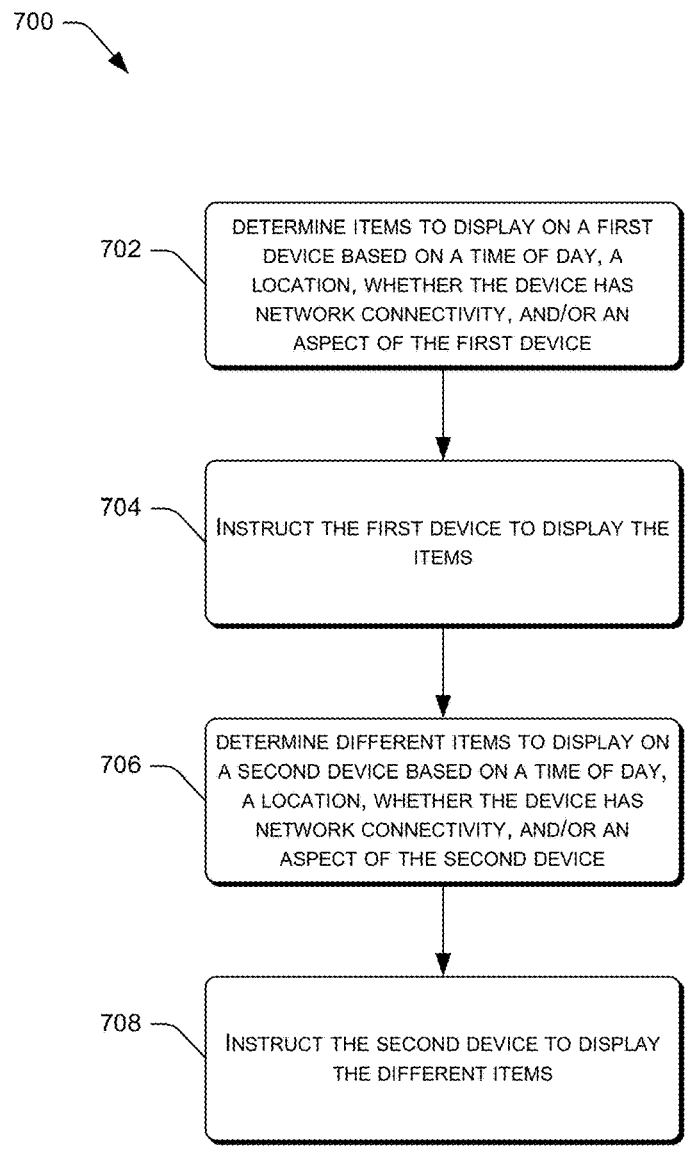
FIG. 7 illustrates an example process for determining items to display on a home screen or other screen of an electronic device.

FIG. 7 illustrates an example process 700 for determining items to display on a home screen or other screen of an electronic device. The process 700 is illustrated as a collection of blocks in a logical flow graph, which represent operations that can be implemented in hardware, software, or a combination thereof. In the context of software, the blocks represent computer-executable instructions that are executable by one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure. The process 700 may be performed locally by a client device, or remotely by an entity in communication with a client device.

At 702, the process 700 determines icons to display on a first device based on at least one of a time of day, a location of the first device, whether the first device currently has network connectivity, or the like. At 704, the process 700 then instructs the first device to display the determined icons. At 706, meanwhile, the process 700 determines, for a second, different device, icons to display on the second device based on at least one of a time of day, a location of the second device, whether the second device currently has network connectivity, or the like. At 708, the process 700 then instructs the second device to display the determined icons.

Figure 8:
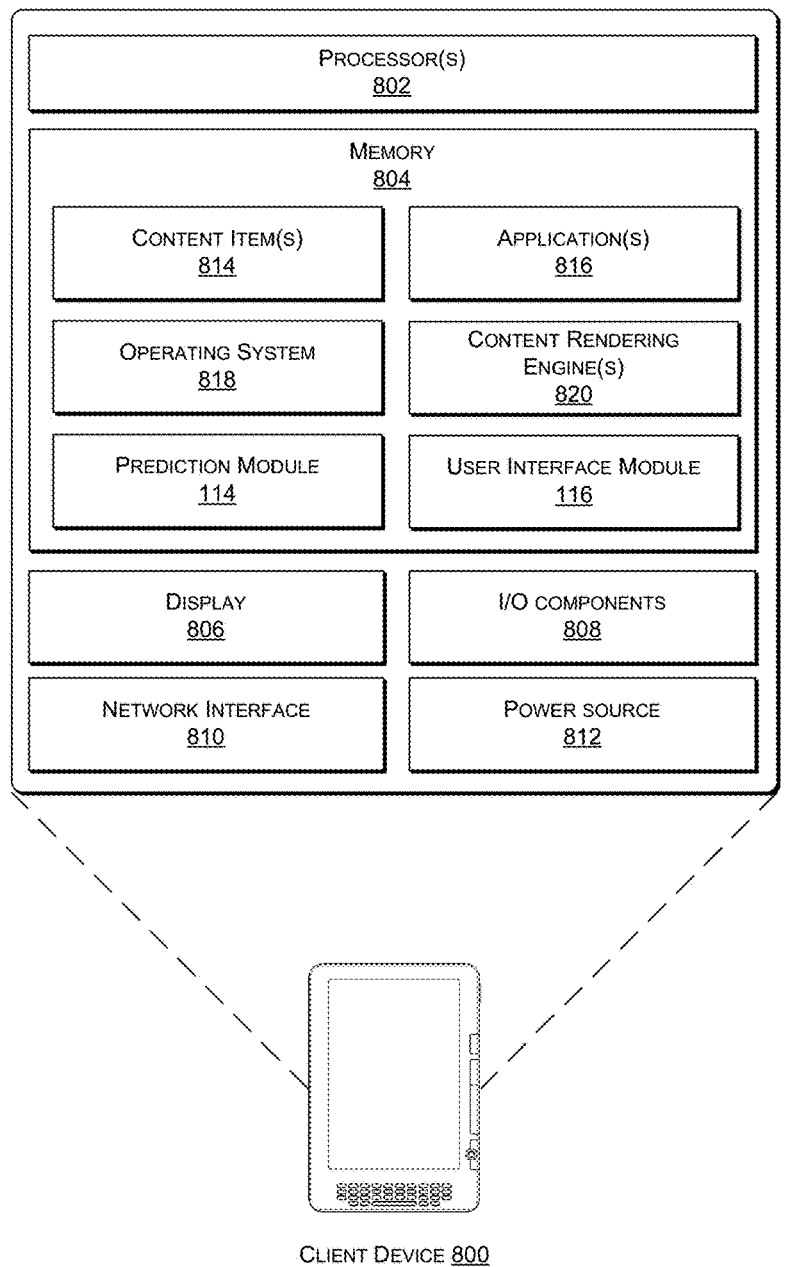
FIG. 8 illustrates an example electronic device that may implement the techniques described herein.

FIG. 8 illustrates an example electronic device 800 that may implement the techniques described herein. As illustrated, the electronic device 800 may include one or more processors 802 and memory 804, one or more displays 806 for displaying content items, one or more I/O components 808 for interacting with the device, one or more network interfaces 810, and one or more power sources 812. The network interfaces 810 may support both wired and wireless connection to various networks, such as cellular networks, radio, WiFi networks, short range networks (e.g., Bluetooth®), infrared (IR), and so forth.

Depending on the configuration of the electronic device 800, the memory 804 (and other memory described throughout) is an example of computer storage media and may include volatile and nonvolatile memory. Thus, the memory 804 may include, but is not limited to, RAM, ROM, EEPROM, flash memory, or other memory technology, or any other medium that can be used to store computer-readable instructions, programs, applications, media items, and/or data which can be accessed by the electronic device 800. In some examples, the computer-readable media is a tangible non-transitory computer-readable media.

The memory 804 may be used to store any number of functional components that are executable on the processor 802, as well as content items 814 and applications 816 that are executed on the electronic device 800. The memory 804 may also store an operating system 818 and one or more content rendering engines 820 to render content items on the device 800. These content presentation engines may be implemented as various applications depending upon the content items. For instance, the content presentation engine may be an electronic book reader application for rending textual electronic books, an audio player for playing audio books or songs, a video player for playing video, and so forth. The memory 804 may also store the prediction module 114 and the user interface module 116, as described above.

While FIG. 8 illustrates a few example components, the electronic device 800 may have additional features or functionality. For example, the device 800 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 800 may reside remotely from the device 800 in some implementations.

The aforementioned techniques include a set of illustrative techniques for display of content on a home screen based on the likelihood of user selection. However other known techniques may be employed to accomplish similar results. Further, the techniques may be used on many other screens other than the home screen of the device.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computing device comprising:
    one or more processors;
    a display;
    a wireless interface; and
    one or more memories comprising programming instructions, the programming instructions being executable by the one or more processors to perform operations comprising:
        generating first data for presentation on the display as a first screen, the first screen comprising a first plurality of icons including a first icon corresponding to a first item available by the computing device, the first item having content accessible to the computing device via the wireless interface;

instructing a user interface to display the first screen on the display;

determining that the computing device lacks a network connection;

determining at least one of a current time of day or a current location of the computing device;

based at least in part on the determining that the wireless interface lacks the network connection and the at least one of the current time of day or the current location, determining a second item available by the computing device, the second item being different from the first item and the second item having content accessible on the computing device in the absence of the network connection;

generating second data for presentation on the display as a second screen, the second screen comprising a second plurality of icons including a second icon corresponding to the second item and the second screen excluding the first icon; and instructing the user interface to display the second screen on the display with the computing device lacking the network connection.

2. A computing device as recited in claim 1, wherein the determining the second item further comprises identifying items previously accessed by the user on the computing device at the current time of day on previous days.

3. A computing device as recited in claim 1, the operations further comprising: determining that the wireless interface of the computing device is turned off by determining that the device is in airplane mode.

4. A computing device as recited in claim 1, wherein the determining the second item comprises identifying items previously accessed by the user on the computing device within a threshold distance from the current location of the computing device on previous days.

5. A computing device comprising:
one or more processors;
a display;
a wireless interface for establishing a network connection; and
one or more memories comprising programming instructions executable by the one or more processors to perform operations comprising:
generating first data for presentation on the display as a first screen, the first screen comprising a first grouping of icons, a first icon of the first grouping of icons representing a first item available by the computing device, the first item having first content accessible to the computing device via the network;
displaying the first screen on the display;
determining that the computing device lacks the network connection;
determining a second item available by the computing device based at least in part on the computing device lacking the network connection, the second item being different from the first item and the second item having content accessible to the computing device in the absence of the network connection;
generating second data for presentation on the display as a second screen, the second screen comprising a second grouping of icons, the second grouping of icons including a second icon representing the second item and the second grouping of icons excluding the first icon; and
displaying the second screen on the display with of the computing device lacking the network connection.

6. The computing device of claim 5, wherein the first grouping of icons corresponds to a first item class and the first item class comprises text items that primarily comprise text, audio items that primarily comprise audio, or video items that primarily comprise video.

7. The computing device of claim 6, the operations further comprising: determining a third item available by the computing device based at least in part on the wireless interface of the computing device being turned off, the second item corresponding to a second item class, the second grouping of icons further including a third icon associated with the third item.

8. The computing device of claim 5, wherein the first item and the second item are items determined to be likely to be accessed by the user on the computing device.

9. The computing device of claim 5, wherein the determining the computing device lacks the network connection comprises determining that the computing device is in an airplane mode.

10. The computing device of claim 5, wherein the determining the second item is based least in part on the current time of day, and wherein the determining comprises identifying items accessed by the user on the computing device at the current time of day on previous days.

11. The computing device of claim 5, wherein the determining the second item is based at least in part on items recently accessed by the user on at least one of the computing device or another computing device associated with the user.

12. The computing device of claim 5, wherein:
the computing device comprises one of multiple computing devices associated with the user; and
the determining the second item is based at least in part on one or more aspects of at least one of the multiple computing devices.

13. The computing device of claim 12, wherein the one or more aspects comprise a display size, a primary function, or a class of items most often accessed by the user.

14. A method comprising:
instructing an electronic device to display a first screen comprising one or more first icons on a display of the electronic device, the one or more first icons comprising a first icon, the first icon corresponding to a first item available by the electronic device and having content accessible to the electronic device via a network connection;
determining that the electronic device lacks network connectivity;
determining a second icon corresponding to a second item available by the electronic device based at least in part on the determining that the electronic device lacks network connectivity and at least one of a time of day or a location of the electronic device, the second item having content accessible to the electronic device in the absence of the network connection and the second item being different from the first item; and
instructing the electronic device to display a second screen comprising one or more second icons on the display of the electronic device with the electronic device lacking network connectivity, the one or more second icons including the second icon and excluding the first icon.

15. The method of claim 14, wherein the determining the second item is based at least in part on one or more aspects of the electronic device.

16. The method of claim 15, wherein the one or more aspects of the electronic device comprise a display size of the electronic device, a primary function of the electronic device, or a class of items most often accessed on the electronic device.

17. The method of claim 14, wherein the electronic device comprises a first of multiple electronic devices associated with a user, the method further comprising;
   determining additional icons corresponding to a different set of items to display on a second of the multiple electronic devices associated with the user.

18. The method of claim 14, wherein the electronic device comprises a first of multiple electronic devices associated with a user, the method further comprising:
   determining additional icons corresponding to a different set of items to display on a second of the multiple electronic devices associated with the user based at least in part on at least one of a different time of day, a location of the second electronic device, or the second electronic device currently lacking network connectivity; and
   instructing the second electronic device to display one or more of the additional icons.

19. The method of claim 14, wherein the determining is further based at least in part on a day of the week.

20. The computing device of claim 5, wherein a relation between the item and the previously consumed item is based at least in part on a common series, subscription, or program.

\* \* \* \* \*